United States Patent
Layne (10) Patent No.: US 6,271,468 B1
(45) Date of Patent: *Aug. 7, 2001

(54) EMBEDDABLE MOUNTING DEVICE WITH FACEPLATE

(75) Inventor: Harry R. Layne, Covington, LA (US)

(73) Assignee: Steel Block, Inc., Covington, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/592,251

(22) Filed: Jun. 12, 2000

Related U.S. Application Data (63) Continuation-in-part of application No. 09/148,501, filed on Sep. 4, 1998, now Pat. No. 6,111,197.

(51) Int. Cl.[7] ............................................. H01J 5/00
(52) U.S. Cl. ........................... 174/50; 174/58; 220/4.02; 361/601; 312/265.5
(58) Field of Search .................................... 174/50, 17 R, 174/48, 49, 58; 220/3.2, 3.3, 4.02; 361/601, 602; 312/265.5; 52/220.8, 28

(56) References Cited

U.S. PATENT DOCUMENTS

| | | | | |
|---|---|---|---|---|
| 460,177 | * | 9/1891 | Cook | 52/590.2 |
| 480,700 | * | 8/1892 | Pauly | 52/667 |
| 1,442,588 | * | 1/1923 | Tompkins | 52/36.4 |
| 1,836,408 | * | 12/1931 | Sutton | 52/607 |
| 2,070,641 | * | 2/1937 | Bartels | 211/90 |
| 2,205,730 | * | 6/1940 | Morgan | 189/34 |
| 3,213,533 | * | 10/1965 | Lynam et al. | 29/528 |
| 3,546,833 | * | 12/1970 | Perreton | 52/314 |
| 3,593,480 | * | 7/1971 | Bouchilon | 52/415 |
| 3,722,152 | * | 3/1973 | Schlatter et al. | 52/79 |
| 3,766,699 | * | 10/1973 | Dinkel | 52/592 |
| 3,932,899 | * | 1/1976 | Dinkel | 52/592 |
| 4,134,636 | * | 1/1979 | Kleinatland et al. | 339/122 R |
| 4,321,770 | * | 3/1982 | Mullins, Jr. | 49/50 |
| 4,390,114 | * | 6/1983 | Sviatoslavsky et al. | 220/337 |
| 4,467,574 | * | 8/1984 | Falge et al. | 52/106 |
| 4,510,725 | * | 4/1985 | Wilson | 52/309.1 |
| 4,677,794 | * | 7/1987 | Parron et al. | 52/36 |
| 4,720,952 | * | 1/1988 | Fricker | 52/235 |
| 5,072,556 | * | 12/1991 | Egenhoefer | 52/126.4 |
| 5,230,195 | * | 7/1993 | Sease | 52/93 |
| 5,473,850 | * | 12/1995 | Balding | 52/426 |
| 5,486,650 | * | 1/1996 | Yetter | 174/53 |
| 5,649,391 | * | 7/1997 | Layne | 52/36.4 |
| 5,651,696 | * | 7/1997 | Jennison | 439/536 |

\* cited by examiner

Primary Examiner—Dean A. Reichard
Assistant Examiner—Dhiru R Patel
(74) Attorney, Agent, or Firm—Shinjyu Global IP Counselors, LLP (57) ABSTRACT

An embeddable mounting device for permanently affixing a wall accessory to a concrete block wall. The embeddable mounting device is in the form of an embeddable block with an attachable faceplate. The embeddable mounting device preferably includes a metal block portion and a metal mounting portion. The metal block portion is designed to permanently affix the mounting device within the concrete wall. The metal mounting portion is designed to receive one of many different types of faceplates. In the illustrated embodiments, the metal block portion has two generally rectangular metal members, and two or three vertical spacer members. The vertical spacer members of the metal block portion are secured between the first and second rectangular metal plate member in a manner to create at least one reinforcing bar and cement receiving cavity between the first and second metal members. The metal mounting portion is fixedly coupled to one of the rectangular metal members, and has two horizontal metal members and two or three vertical spacer members. The first rectangular metal member and the second rectangular metal member preferably have equal dimensions.

10 Claims, 5 Drawing Sheets

EMBEDDABLE MOUNTING DEVICE WITH FACEPLATE

CROSS-REFERENCE TO RELATED APPLICATION

This application is a continuation-in-part application of applicants U.S. patent application Ser. No. 09/148,501, filed Sep. 4, 1998, now U.S. Pat. No. 6,111,197, issued on Aug. 29, 2000. The entire disclosure of U.S. Pat. No. 6,111,197 is hereby incorporated herein by reference.

BACKGROUND OF THE INVENTION

1. Field of the Invention

This invention generally relates to an embeddable mounting device, which is mounted in a block wall. More specifically, the present invention relates to an embeddable mounting device, which utilizes an attachable faceplate such that the embeddable mounting device can be modified to suit a particular situation.

2. Background Information

Many buildings are currently being constructed of concrete blocks. It has been a common practice within the construction industry to affix various wall accessories (wall hooks, shelves, etc.) to concrete block walls. There are various types of wall attachment assemblies or anchors for securing wall accessories to concrete blocks. However, these prior art devices often suffer from many disadvantages. For example, the wall anchors often fail, such that the wall accessory can be pulled out of the concrete block. Also, some of the prior art anchoring systems require a substantial amount of time and effort to install. In addition, many of these prior art anchoring systems are not suitable for certain applications such as in detention centers or other public facilities, such as jails, prisons, juvenile detention centers and psychiatric hospitals.

It is a common practice within the detention industry and other public facilities, such as jails, prisons, juvenile detention centers, and psychiatric hospitals, for their new construction projects to construct the walls of a detection facility out of concrete blocks. To maximize security, these types of facilities have wall constructions that often require the interior of the blocks to have a cement agent poured into the cavity or cavities and that the cavities have one or more reinforcing rods extending from the interior of the block into the concrete blocks that are above and below. Also it is a common practice these types of facilities to permanently affix certain finishing such as the beds, cabinets, shelves, lavatories, sinks etc. and fixtures such as steel wall plates to the walls of the facility. A steel wall plate is a sheet of steel that is utilized to form or cover an existing wall to provided addition security within the facility. Permanently affixing these fixtures to the walls prevents destruction of the fixtures themselves and reduces the likelihood of an inmate utilizing the fixtures as a weapon to injure a guard or cell mate. The conventional method of permanently installing these fixtures has been to form a cavity within a fully constructed wall unit, install a reinforcing bar or bars into the cavity, and then grouting the reinforcing bar(s) within the cavity using a cementing agent such as cement. A steel plate is then welded or otherwise affixed to the reinforcing bars in a manner to cover the grouted cavity opening. The steel plate acts as a mounting base to which a fixture mounting bracket, such as a length of angle iron, is welded or otherwise permanently affixed.

This method of permanently affixing fixtures to concrete block walls, masonry walls and pre-cast walls is labor intensive and leads to a degraded wall structure. While this method works, it has several drawbacks. For example, the steel plate does not lie flush with the concrete block such that prisons could hide things such as hide razor blades, knives, drugs, and other contraband articles between the steel plate and the concrete block It would be a benefit, therefore, to have a embeddable mounting device that could be used in connection with a wall that did not provide a gap between the wall and a steel mounting surface and that forms an integral part of the wall construction. It would also be desirable to have a method for mounting a fixture permanently to a concrete block wall that did not require degrading the wall structure by forming a cavity within the preexisting wall during installation of the fixture.

One attempt to overcome some of the problems of the prior art is disclosed in U.S. Pat. No. 5,649,391, issued to Harry R. Layne, on Jul. 22, 1997. In this patent, a steel block is disclosed which is embedded into the concrete wall. This patent discloses welding the furniture or accessory to the wall. Moreover, this patent also teaches having fasteners formed on the steel block. While this steel block works very well for many applications, it is often limited to certain types of applications and/or requires welding the accessory to the steel plate.

In view of the above, there exists a need for an embeddable mounting device which overcomes the above mentioned problems in the prior art. This invention addresses this need in the prior art as well as other needs, which will become apparent to those skilled in the art from this disclosure.

SUMMARY OF THE INVENTION

One object of this invention is to provide an embeddable mounting device with a faceplate that is installed within a concrete block wall, a masonry wall or a pre-cast concrete wall.

Another object of the present invention is to provide an embeddable mounting device that will not require additional plastering of the walls when a wall accessory is installed.

A further object of the invention is to provide a method of permanently and securely mounting a wall accessory to a wall that can not be removed without the use of security tools.

The new steel block or embeddable mounting device in accordance with the present invention is designed to eliminate some of the problems that have been experienced by the construction industry. The block or embeddable mounting device of the present invention reduces the cost of installation and provides a steel block that is designed to receive various faceplates with wall accessories or to be used as an in-wall electrical box. The block or embeddable mounting device can be either a half-size block or a full size block.

The foregoing objects can basically be attained by an embeddable mounting device for embedding in a masonry block wall that can be used to mount a wall accessory or an electrical device thereto. The embeddable mounting device comprises a first rectangularly shaped metal member, a second rectangularly shaped metal member, a pair of first spacer members and a rectangularly shaped box extending from the second metal member to form a recess with an open face. The first rectangularly shaped metal member has a first outer surface, a first inner surface, a first length, a first height and a first predetermined thickness between the first outer surface and the first inner surface. The second rectangularly shaped metal member has a second outer surface, a second inner surface, a second length, a second height and a second predetermined thickness between the second outer surface and the second inner surface. The second length and the second height of the second metal member being substantially equal to the first length and the first height, respectively. The pair of first spacer members is coupled between the first metal member and the second metal member to form a block with a hollow interior having the first metal member and the second metal member being arranged substantially parallel to each other. The first spacer members extend between the first and second metal members to form at least one cement cavity. The rectangularly shaped box has first and second opposed walls with predetermined lengths and third and fourth opposed walls with predetermined heights that are substantially equal to the second height. The rectangularly shaped box has a mounting portion with mounting holes formed therein.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
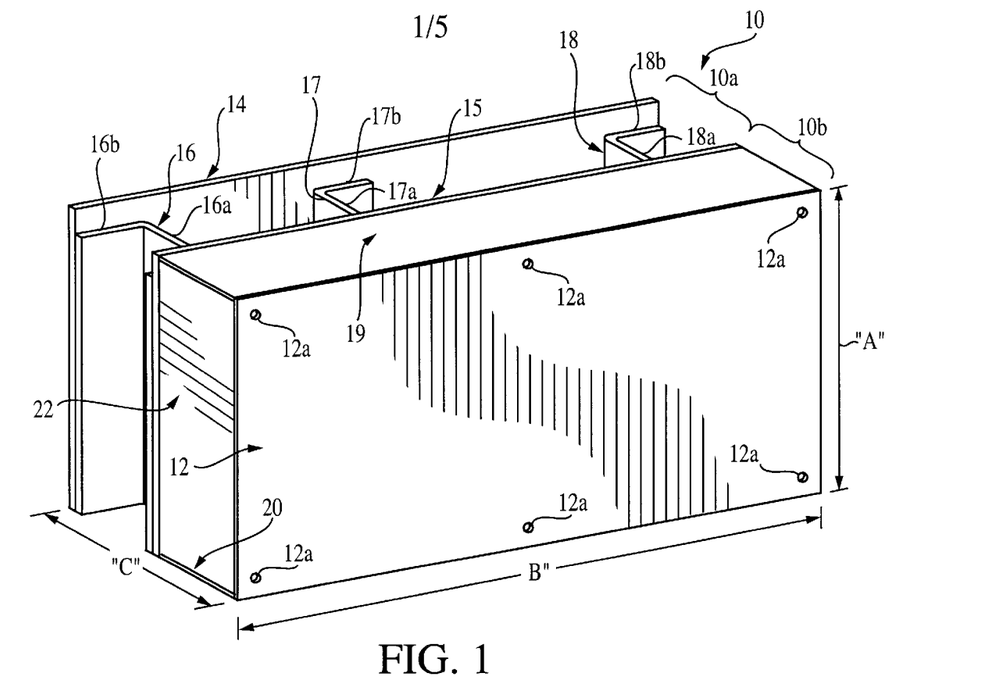
FIG. 1 is a perspective view of an embeddable mounting device in accordance with one embodiment of the present invention.
Figure 6:
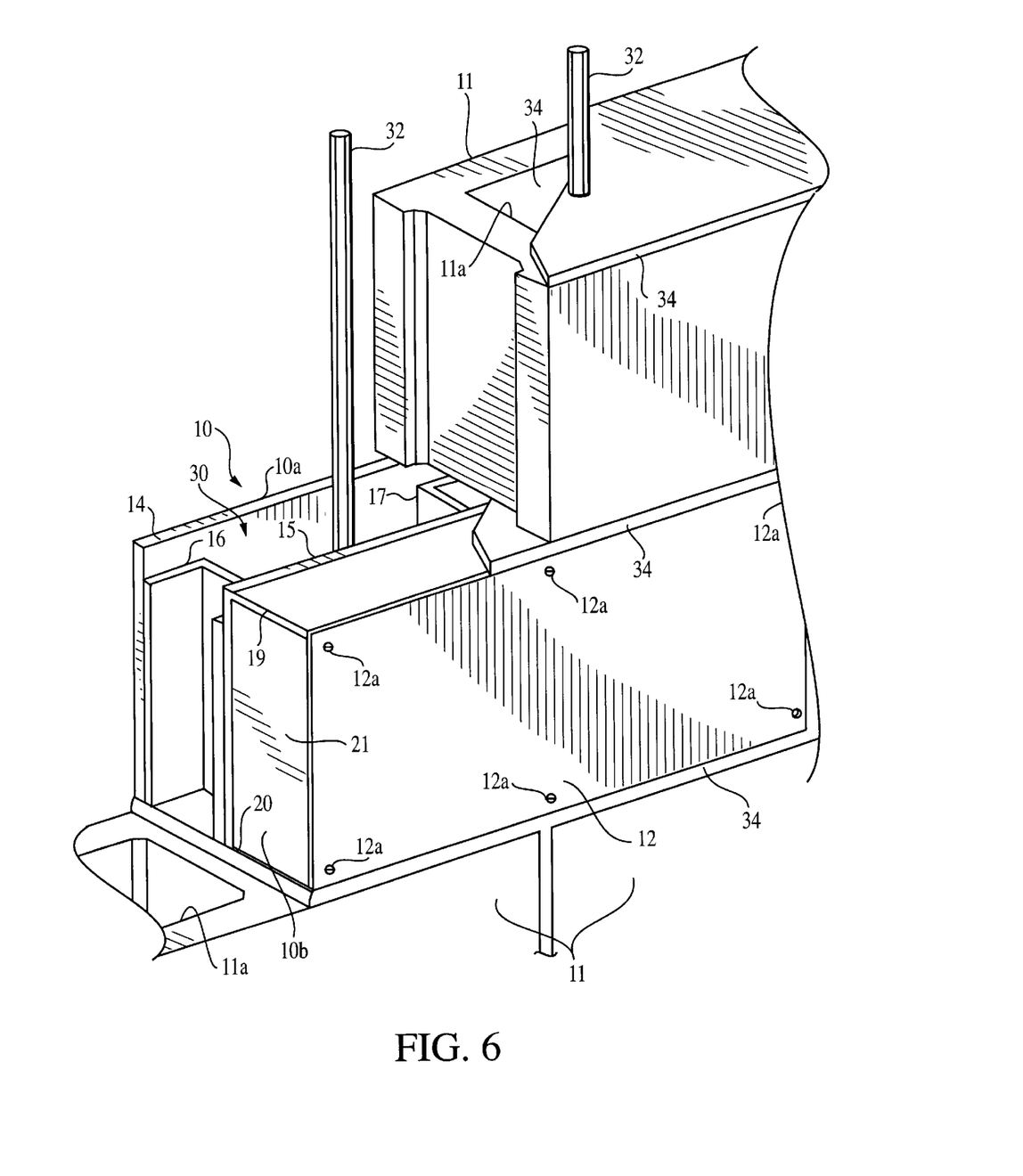
FIG. 6 is a partial perspective view of the embeddable mounting device partially mounted in a block wall in accordance with the first embodiment of the present invention.

Referring initially to FIG. 1, a perspective view of an embeddable mounting device 10 is illustrated in accordance with one embodiment of the present invention. Mounting device 10 is designed to allow various wall accessories (wall hooks, shelves, toilet paper holders, mirrors, cabinets, etc.) or electrical fixtures or electrical devices to be mounted within a concrete block wall of concrete blocks 11 as seen in FIG. 6. Mounting device 10 basically includes a metal block portion 10a, and a metal mounting portion 10b, with a faceplate 12. Faceplate 12 is preferably removably secured to mounting portion 10b, by security fasteners 12a, so that various types of faceplates can be installed on the base unit formed of block portion 10a, and mounting portion 10b. Moreover, removably security fasteners 12a, allow access to the interior portion of the box for future adjustments. In other words, the parts of block portion 10a, and the parts of mounting portion 10b, are fixedly secured (e.g. welded) together to form a base unit that can be sold with various types of faceplates. Alternatively, security fasteners 12a, can be replaced with a more permanent type of fastener such as rivets.

Figure 7:
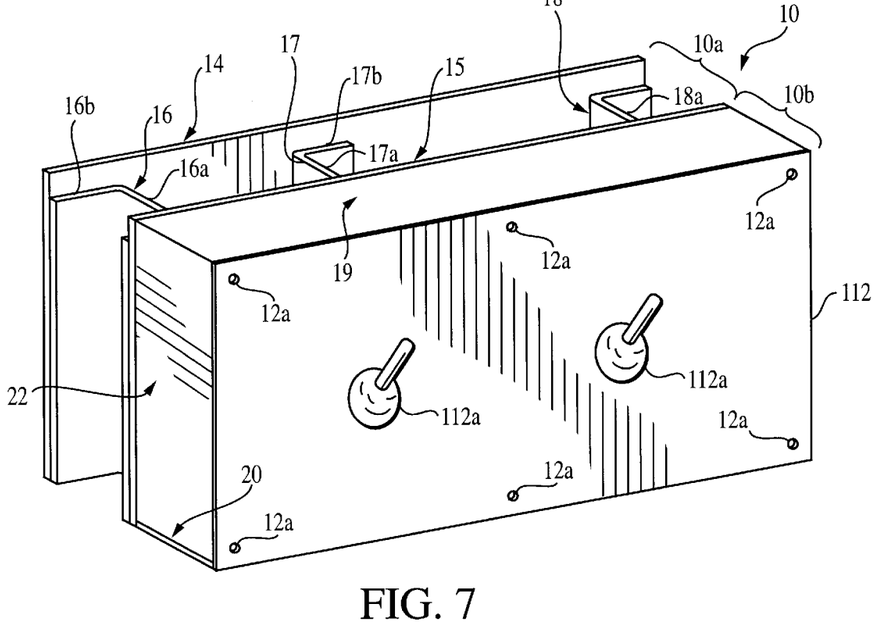
FIG. 7 is a perspective view of the embeddable mounting device having a faceplate with a pair of hooks.
Figure 8:
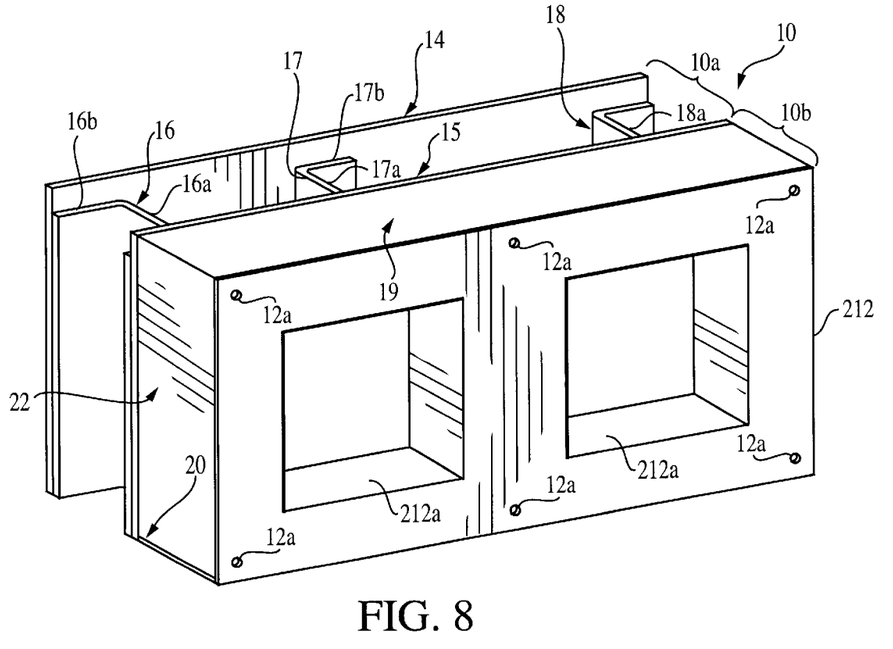
FIG. 8 is a perspective view of the embeddable mounting device having a faceplate with a pair of recesses that form shelves.

As seen in FIGS. 7 and 8, the faceplate 12 can be substituted for a faceplate 112 which utilizes hooks 112a, or faceplate 212 which has a pair of shelf-like recesses 212a. Accordingly, the present invention allows the mounting device 10 to be used with a variety of faceplates, which can have a variety of shapes and/or devices coupled thereto. For example, the faceplate can include toilet paper holders, mirrors, cabinets, soap dish, etc. In the illustrated example of FIG. 1, the faceplate is a flat metal plate that can be removed and replaced with either faceplate 112 or faceplate 212, as well as other types of faceplates with other types of wall accessories. The faceplate 112 illustrated in FIG. 7 has hooks 112a, which are constructed in accordance with U.S. Pat. No. 3,957,241, the disclosure of which is hereby incorporated herein by reference. The faceplate 212 of FIG. 8 is preferably constructed of a steel plate that is punched or stamped to form a pair of recess shelves 212a, While the shelves 212a, are shown as rectangular in shape, it will be apparent to those skilled in the art from this disclosure that the shelves could have other shapes, such as to be circular to hold toilet paper, or the like. Moreover, the metal plate forming faceplate 212 could be stamped to form outwardly protruding shelves, as needed and/or desired.

Mounting device 10 is constructed to be permanently embedded in a wall constructed out of concrete blocks 11 as seen in FIG. 6. As explained below, mounting device 10 allows for concrete to be poured into the interior of mounting device 10 and for one or more reinforcing rods to extend from the interior of the mounting device 10 into the concrete blocks 11 that are above and below as seen in FIG. 6.

Block portion 10a, is preferably formed of two rectangularly shaped metal plate members 14 and 15 that are fixedly coupled together by three metal spacer members 16, 17 and 18. Preferably, metal plate members 14 and 15 are welded to metal spacer members 16, 17 and 18. Block portion 10a, forms a steel block similar to the one disclosed in U.S. Pat. No. 5,649,391, but with a smaller depth to accommodate metal mounting portion 10b. The entire disclosure of U.S. Pat. No. 5,648,391 is hereby incorporated herein by reference.

Mounting portion 10b, is welded to metal plate member 15. Mounting portion 10b, is preferably formed by a pair of horizontal metal plate members 19 and 20 that are fixedly coupled (e.g. welded) together by three metal spacer members 21, 22 and 23. The mounting portion 10b, (rectangularly shaped box) extends from the second metal member 15 to form a recess with an open face. The two horizontal rectangularly shaped metal members 19 and 20 form first and second opposed walls with predetermined lengths, while the three metal spacer members 21 and 23 form third and fourth opposed walls with predetermined heights and the metal spacer members 22 form an intermediate wall with a predetermined height.

As seen in FIG. 6, the mounting device 10 is embedded within a concrete block wall constructed of blocks 11 such as cinder blocks, concrete blocks or masonry blocks. Mounting device 10 is designed to be grouted just like the cinder blocks, concrete blocks or masonry blocks 11. Thus, when the mounting device 10 is used with conventional concrete blocks or masonry blocks 11, mounting device 10 is preferably approximately the same size as the conventional concrete blocks 13 or half the size as the conventional concrete blocks 11. In other words, mounting device 10 can be a half block, or a full block, i.e., the same size as the cinder blocks, concrete blocks or masonry blocks 11. For example, mounting device 10 with a full block size can have a height "A" between about seven inches (7") and nine inches (9"), a length "B" between about seven inches (7") and seventeen inches (17") and a depth or width "C" preferably between seven inches (7") and nine inches (9"). This size of mounting device 10 allows the block to completely fill the space normally occupied by a conventional cinder block, concrete block or masonry block.

It will be apparent to those skilled in the art from this disclosure that these metal plate members 14–23 can be constructed of several plates which are fixedly secured together by suitable means such as welding. It will also be apparent to those skilled in the art from this disclosure that some of these metal plate members 14–23 can be constructed from a single plate which is bent to form two or more of the metal plate members. For example, the first and second rectangularly shaped metal members 14 and 15 can be integrally formed with metal spacer members 16, 17 and 18 by bending a metal plate in to a shape that substantially corresponds to these parts as seen in the accompanying FIG.s.

In the illustrated embodiment, the first and second rectangularly shaped metal plate members 14 and 15 are both preferably constructed of one-quarter (¼") inch thick gauge mild steel plates. However, lesser gauges of steel can be used if applicable. In a full block size, the first and second rectangular metal plate members 14 and 15 each have a height "A" of about seven and five-eighths (7⅝") inches, a length "B" of about fifteen and five-eighths (15⅝") inches. The depth "C" of mounting device 10 is preferably about seven and five-eighths (7⅝") inches. Of course, for a half block, the length "B" of metal plate members 14 and 15 would preferably be about seven and five-eighths (7⅝") inches.

The faceplate (third rectangular metal plate member) 11 is constructed of ten gauge mild steel plate which has height and length dimensions that are substantially the same as the first and second metal plate members 14 and 15. Of course, it will be apparent to those skilled in the art from this disclosure that the size of the mounting device 10 can be other sizes depending upon the cinder blocks, concrete blocks or masonry blocks being used therewith.

Figure 2:
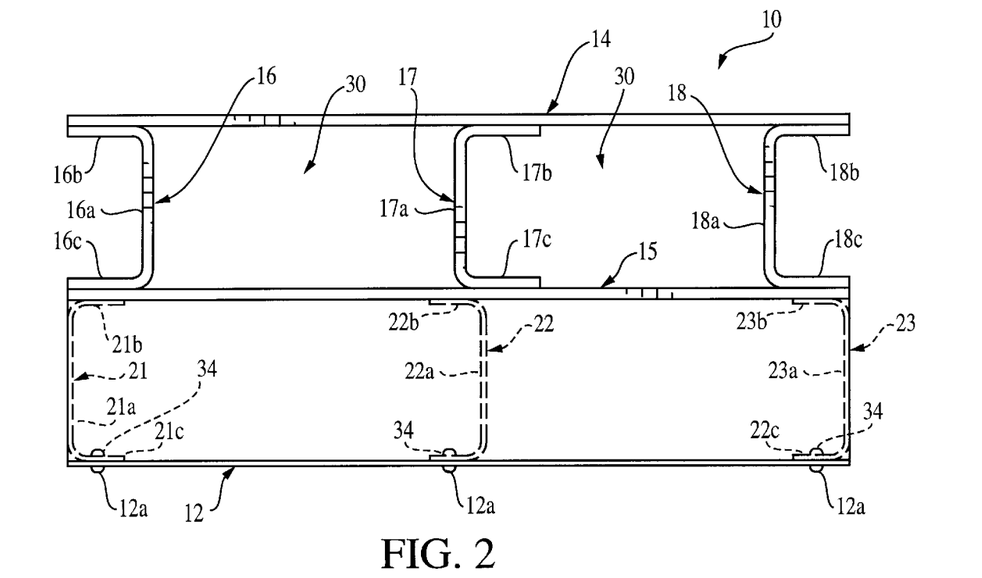
FIG. 2 is a top plan view of the embeddable mounting device illustrated in FIG. 1 in accordance with the first embodiment of the present invention.
Figure 3:
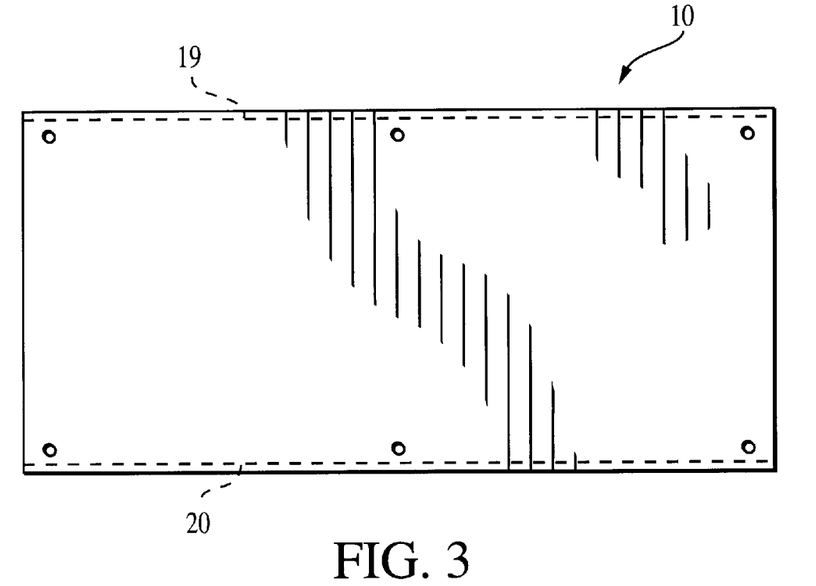
FIG. 3 is a front elevational view of the embeddable mounting device illustrated in FIGS. 1 and 2 in accordance with the first embodiment of the present invention.
Figure 4:
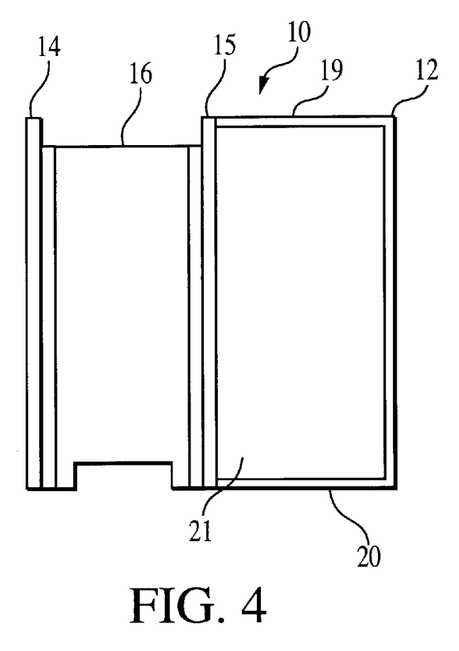
FIG. 4 is a left side elevational view of the embeddable mounting device illustrated in FIGS. 1–3 in accordance with the first embodiment of the present invention.
Figure 5:
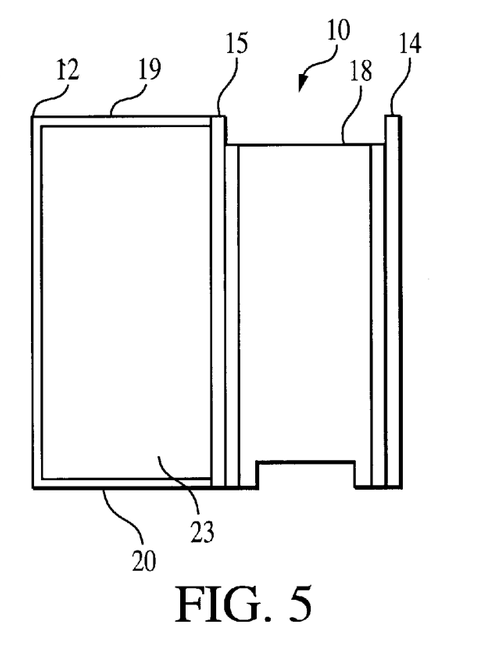
FIG. 5 is a right side elevational view of the embeddable mounting device illustrated in FIGS. 1–4 in accordance with the first embodiment of the present invention.

Referring now to FIG. 2, the first and second rectangularly shaped metal plate members 14 and 15 are planar members, which are secured together by the spacer members 16, 17 and 18 so as to be spaced a predetermined distance apart from each other. The spacer members 16, 17 and 18 hold the first and second rectangular metal plate members 14 and 15 substantially parallel to each other. Two concrete or cement receiving cavities 30 are formed between the first and second rectangularly shaped metal plate members 14 and 15 and the spacer members 16, 17 and 18.

As seen in FIG. 6, the cavities 30 are designed to receive reinforcing bars 32 and cement 34 therein. The spacer members 16, 17 and 18 are preferably constructed from one-quarter (¼") inch thick mild steel plate. The spacer members 16, 17 and 18 can have the same or a smaller height than the first and second rectangularly shaped metal plate members 14 and 15. Moreover, the height of the spacer members 16, 17 and 18 can vary if needed and/or desired. Also, the spacer members 16, 17 and 18 can have different shapes and/or sizes than illustrated. For example, the spacer members 16, 17 and 18 can have cutouts.

The side edges of spacer members 16, 17 and 18 are bent to form attachment flanges. These bends of spacer members 16, 17 and 18 preferably have a radius of about one-quarter (¼") inch radius. These bends are located about one (1") inch from the side edges and run parallel to the rectangularly shaped metal plate members.

These bends are formed in a manner to form spacer members 16, 17 and 18 with U-shaped cross sections. The spacer members 16, 17 and 18 each includes a central section 16a, 17a or 18a, a first leg section 16b, 17b or 18b and a second leg section 16c, 17c or 18c respectively. The first leg sections 16a, 17a and 18a are fixedly coupled to the first rectangularly shaped metal plate member 14, while the second leg sections 16b, 17b and 18b are fixedly coupled to the second rectangularly shaped metal plate member 15.

Spacer members 21, 22 and 23 are fixedly coupled to the second rectangularly shaped metal plate member 15 and to horizontal plate members 19 and 20 to form a pair of spaces that can accommodate various types of faceplates, such as one of the faceplates 12, 112, and 212 as seen in FIGS. 1, 7 and 8. The spacer members 21, 22 and 23 are preferably constructed from ten gauge mild steel plate, while the horizontal metal plate members 19 and 20 are preferably constructed of fourteen gauge mild steel plates. The spacer members 21, 22 and 23 preferably have heights that are slightly smaller than the heights of the first and second rectangularly shaped metal plate members 14 and 15 to accommodate horizontal plate members 19 and 20. Of course, the height of spacer members 21, 22 and 23 can vary if needed and/or desired.

The side edges of spacer members 21, 22 and 23 are bent to form attachment flanges. These bends preferably each have a radius of about one-quarter (¼") inch. The bends are located about one (1") inch from the side edge and run parallel to the rectangular metal plate members. The bends are formed in a manner to form spacer members 21, 22 and 23 with U-shaped cross sections. The spacer members 21, 22 and 23 each includes a central section 21a, 22a or 23a, a first leg section 21b, 22b or 23b and a second leg section 21c, 22c or 23c, respectively. Second leg sections 21c, 22c or 23c of spacer members 21, 22 and 23 have each been drilled and tapped to form a pair of mounting flanges with threaded holes 34 that receive security screws 12a, for securing one of the faceplates 12, 112 or 212 thereto.

The first and second horizontal plate members 19 and 20 are fixedly secured to the second rectangularly shaped metal plate member 15 and the spacer members 21, 22 and 23. The first and second horizontal plate members 19 and 20 extend substantially perpendicular to the second rectangularly shaped metal plate member 15, as well as extend substantially perpendicular to the central sections 21a, 22a and 23a of the spacer members 21, 22 and 23. Accordingly, two tubular members with rectangular cross sections are formed by the central sections 21a, 22a and 23a and the horizontal plate members 19 and 20.

Referring again to FIG. 6, perspective view of a partially constructed concrete block wall is illustrated. Block wall is constructed from a plurality of conventional blocks 11 such as cinder blocks, concrete blocks or masonry blocks. Each of the blocks 11 includes a pair of cement receiving cavities 11a. A mounting device 10 is shown installed between the concrete blocks 11 so that the mounting device 10 becomes an integral part of concrete block wall.

An exemplary method of installing the embeddable mounting device into the concrete block wall will now be described with general reference to FIGS. 1–5 and particular reference to FIG. 6. In this exemplary method of permanently attaching and embedding the mounting device 10 into the concrete block wall, the method includes the step of installing at least one mounting device or steel block 10, as described above, into the concrete block wall in place of one of the blocks 11 during construction of the concrete block wall. Installation of mounting device or steel block 10 is as follows. First, the cinder, concrete or masonry blocks 11 are laid down to begin construction of the concrete wall. Next, the mounting device 10 is placed unto one or more of the cinder, concrete or masonry blocks 11 of the concrete wall in a desired location. One of the reinforcing bars 32 is received in the cavity 30 of the mounting device or steel block 10. The cavity 30 is at least partially aligned with one of the cement receiving cavities 11a of one of the cinder, concrete or masonry blocks 11. With the vertical reinforcing bars 32 in place, a cementing slurry mixture is then poured into the cavities 11a and 30 in a manner such that the vertical reinforcing bars 32 and a quantity of the cementing slurry mixture fill the cement receiving cavity 30 of mounting device 10 and the cement receiving cavities 11a of cinder, concrete or masonry blocks 11. The cementing slurry mixture is then allowed to harden while the concrete wall is fully constructed.

ELECTRICAL BOX BLOCK EMBODIMENT

Figure 9:
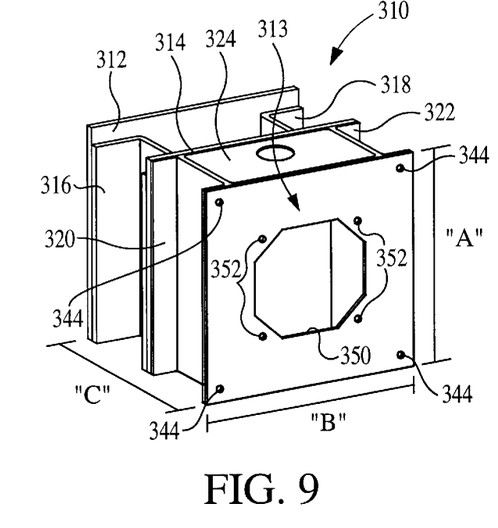
FIG. 9 is a perspective view of an embeddable mounting device in accordance with another embodiment of the present invention.
Figure 10:
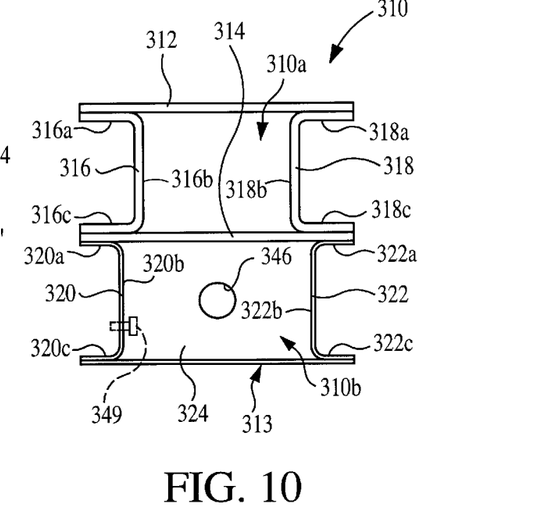
FIG. 10 is a top plan view of the embeddable mounting device illustrated in FIG. 9 in accordance with the present invention.
Figure 11:
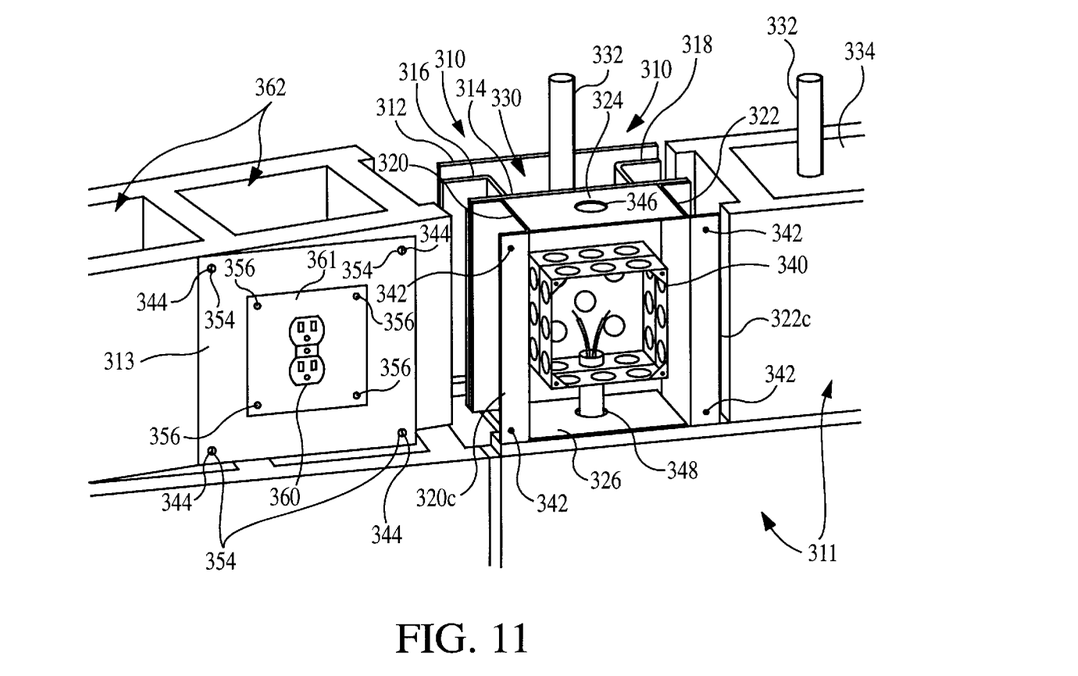
FIG. 11 is a partial perspective view of the embeddable mounting device partially mounted in a block wall in accordance with the present invention.

Referring now to FIGS. 9–11, an embeddable mounting device 310 is illustrated as an electrical box block in accordance with another embodiment of the present invention. Embeddable mounting device 310 is more fully disclosed in U.S. patent application Ser. No. 09/148,501, filed Sep. 4, 1998. The entire disclosure of U.S. patent application Ser. No. 09/148,501 is hereby incorporated herein by reference. Thus, embeddable mounting device or block 310 will not be discussed or illustrated in as much detail herein.

Basically, embeddable mounting device or block 310 basically includes a block portion 310a and a mounting portion 310b with a generally rectangular faceplate 313 coupled to mounting portion 310b. The block portion 310a has two rectangularly shaped metal members 312 and 314 and two metal spacer members 316 and 318. The mounting portion 310b is a substantially rectangularly shaped member or box that is fixedly secured to rectangular metal member 314. The mounting portion 310b has two metal spacer members 320 and 322 and two horizontal metal members 324 and 326. The mounting portion 310b (rectangularly shaped box) extends from the second metal member 314 to form a recess with an open face. The two horizontal metal members 324 and 326 form first and second opposed walls with predetermined lengths, while the two metal spacer members 320 and 322 form third and fourth opposed walls with predetermined heights. Preferably, these metal members are constructed of metal plates to form a metal block, which are capable of mounting an electrical fixture or device.

As seen in FIG. 11, the embeddable mounting device or electrical box block 310 is embedded within a block wall constructed of blocks 311 such as cinder blocks, concrete blocks or masonry blocks. The embeddable mounting device or electrical box block 310 is designed to be grouted just like the cinder blocks, concrete blocks or masonry blocks 311. Thus, the embeddable mounting device or electrical box block 310 preferably has a height "A" between about seven inches and nine inches, a length "B" between about seven inches and seventeen inches and a depth or width "C" preferably between seven inches and nine inches. This size of block 310 allows the block to completely fill the space normally occupied by a conventional cinder block, concrete block or masonry block. While the mounting device or electrical box block 310 is illustrated as a half block, it will be apparent to those skilled in the art from this disclosure that the mounting device or electrical box block 310 can be a full block, i.e., the same size as the cinder blocks, concrete blocks or masonry blocks 311.

It will be apparent to those skilled in the art from this disclosure that these metal plate members 312, 314, 316, 318, 320, 322, 324 and 326 can be constructed of several plates which are fixedly secured together by suitable means such as welding. It will also be apparent to those skilled in the art from this disclosure that some of these metal plate members 312, 314, 316, 318, 320, 322, 324 and 326 can be constructed from a single plate which is bent to form two or more of the metal plate members. For example, the first and second rectangularly shaped metal members 312 and 314 can be integrally formed with metal spacer member 316 by bending a metal plate into a U-shaped member.

In the illustrated embodiment, the first and second rectangularly shaped metal plate members 312 and 314 are both preferably constructed of one-quarter (¼") inch thick mild steel plates. However, lesser gauges of steel can be used if applicable. The first and second rectangularly shaped metal plate members 312 and 314 each have a height "A" of about seven and five-eighths (7⅝") inches, a length "B" of about seven and five-eighths (7⅝") inches. The depth "C" of block 310 is preferably about seven and five-eighths (7⅝") inches. Similarly, faceplate 313 is constructed often gauge mild steel plate which has a height and a length that are substantially the same as the first and second metal plate members 312 and 314. In the case of a full size block, the faceplate 313 and the rectangular metal plate members 312 and 314 are preferably constructed with a height "A" of about seven and five-eighths (7⅝") inches and a width "B" of about fifteen and five-eighths (15⅝") inches. The depth "C" of a full size block 310 would still preferably be about seven and five-eighths (7⅝") inches. Of course, it will be apparent to those skilled in the art from this disclosure that the size of the embeddable fixture mounting device or electrical box block 310 can be other sizes depending upon the cinder blocks, concrete blocks or masonry blocks 311 being used therewith.

Referring now to FIG. 10, the first and second rectangular metal plate members 312 and 314 are planar members, which are secured together by the first and second spacer members 316 and 318 so as to be spaced a predetermined distance apart from each other. The first and second spacer members 316 and 318 hold the first and second rectangularly shaped metal plate members 312 and 314 substantially parallel to each other. A concrete or cement receiving cavity 330 is formed between the first and second rectangularly shaped metal plate members 312 and 314 and the first and second spacer members 316 and 318.

As seen in FIG. 11, the cavity 330 is designed to receive reinforcing bars 332 and cement 334 therein. The first and second spacer members 316 and 318 are preferably constructed from one-quarter (¼") inch thick mild steel plate. The first and second spacer members 316 and 318 can have the same or a smaller height than the first and second rectangular metal plate members 312 and 314. Moreover, the height of the first and second spacer members 316 and 318 can vary if needed and/or desired.

The side edges of first and second spacer members 316 and 318 are bent to form attachment or mounting flanges. These bends of spacer members 316 and 318 preferably have a radius of about one-quarter (¼") inch radius. These bends are located about one (1") inch from the side edges and run parallel to the rectangular metal plate members 312 and 314. These bends are formed in a manner to form spacer members 316 and 318 with U-shaped cross sections. The spacer members 316 and 318 each include a first leg section 316a or 318a, a central section 316b or 318b, and a second leg section 316c or 318c respectively. The first leg sections 316a and 318a are fixedly coupled to the first rectangular metal plate member 312, while the second leg sections 316c and 315c are fixedly coupled to the second rectangularly shaped metal plate member 314.

The faceplate 313 and second rectangularly shaped metal plate member 314 are secured together by third and fourth spacer members 320 and 322 and horizontal metal members 324 and 326 to form a space therebetween for receiving electrical box 340 as seen in FIG. 11. The third and fourth spacer members 320 and 322 are preferably constructed from ten gauge mild steel plate. The third and fourth spacer members 320 and 322 preferably have the same height as the first and second rectangular metal plate members 312 and 314. Of course, the height of third and fourth spacer members 320 and 322 can vary if needed and/or desired.

The side edges of third and fourth spacer members 320 and 322 are bent to form attachment flanges. These bends preferably each have a radius of about one quarter (¼") inch. The bends are located about one (1") inch from the side edge and run parallel to the rectangular metal plate members. The bends are formed in a manner to form spacer members 320 and 322 with U-shaped cross sections. The spacer members 320 and 322 each includes a first leg section 320a or 322a, a central section 320b or 322b, and a second leg section 320c or 322c, respectively. Second leg sections 320c and 322c of third and fourth spacer members 320 and 322 have been drilled and tapped to form a pair of mounting flanges with threaded holes 342 that receive security screws 344 for securing the faceplate 313 thereto.

The first and second horizontal plate members 324 and 326 are fixedly secured to the second rectangular metal plate member 314 and the third and fourth spacer members 320 and 322. The first and second horizontal plate members 324 and 326 extend substantially perpendicular to the second rectangular metal plate member 314, as well as extend substantially perpendicular to the central sections 320b and 322b of the spacer members 320 and 322. Accordingly, a tubular member having a rectangular cross section is formed by the central sections 320b and 322b and the horizontal plate members 324 and 326.

When the faceplate 313 is attached to the second leg sections 320c and 322c of the third and fourth spacer members 320 and 322, an electricalenclosure is formed. This enclosure can be an electrical outlet box by itself, or can have an electrical box 340 fixedly secured therein. The third and fourth spacer members 320 and 322 can be inverted and the first and second horizontal plate members 324 and 326 can be made longer to increase the internal volume of the enclosure without increasing the overall size of the mounting device 310.

As best seen in FIG. 11, the first and second horizontal plate members 324 and 326 each have a punch-out or hole 346 or 348 for receiving an electrical conduit therethrough. Holes 346 and 348 are preferably aligned with each other and located in the center of their respective horizontal plate members 324 or 326. As seen in FIG. 10, a ground screw 349 can be threaded into a hole in the spacer member 320. The precise location of the ground screw 349 is not important. Thus, the ground screw 349 could be coupled to one of the horizontal plate members 324 or 326, if desired.

Referring again to FIGS. 9 and 11, the faceplate 313 has a centrally located cutout or opening 350, four mounting holes 352 located symmetrically around the cutout or opening 350 and four mounting holes 354 located at the corners of the faceplate 313. The opening 350 can be, for example, an octagonal cutout, which measures three and one-half (3½") inches by four (4") inches. Of course, opening 350 can have other shapes as needed and/or desired. The four mounting holes 352 are located symmetrically around the cutout or opening 350 and are preferably 3/16" holes for receiving screws 356 therethrough to mount the wiring device 360 (FIG. 11) thereto. More specifically, the screws 356 first extend through holes in the mounting plate 361 of the wiring device 360 (FIG. 11). Then, the screws 356 extend through the mounting holes 352 of the faceplate 313 where the screws 356 are threaded into the threaded holes of the electrical box 340. Alternatively, mounting holes 352 can be threaded for threadedly receiving the screws 356 to secure the wiring device 360 directly to the faceplate 313.

The mounting holes 354 of the faceplate 313 are preferably 3/16" holes, which are located one-half (½") inch inward from each corner of the faceplate 313. Holes 354 threadedly receive security screws 344 therein to removably secure the faceplate 313 to leg sections 320c and 322c of third and fourth spacer members 320 and 322.

Referring again to FIG. 11, a perspective view of partially constructed concrete block wall is illustrated. Block wall is constructed from a plurality of conventional blocks 311 such as cinder blocks, concrete blocks or masonry blocks. Each block 311 includes a pair of cement receiving cavities 362. A mounting device 310 is shown installed between the concrete blocks 311 so that the mounting device 310 becomes an integral part of block wall.

The terms of degree such as "substantially", "about" and "approximately" as used herein mean a reasonable amount of deviation of the modified term such that the end result is not significantly changed. These terms should be construed as including a deviation of ±10% of the modified term if this would not negate the meaning of the word it modifies.

While only selected have been chosen to illustrate the present invention, it will be apparent to those skilled in the art from this disclosure that various changes and modifications can be made herein without departing from the scope of the invention as defined in the appended claims. Moreover, the foregoing description of the embodiments of the present invention are provided for illustration only, and not for the purpose of limiting the invention as defined by the appended claims and their equivalents. Thus, it is to be understood that the details herein are to be interpreted as illustrative and not in a limiting sense, and that many varying and different embodiments may be made within the scope of the inventive concept(s) taught herein.

What is claimed is:

1. An embeddable mounting device for embedding in a block wall, said embeddable mounting device comprising:

a first rectangularly shaped metal member having a first outer surface, a first inner surface, a first length, a first height and a first predetermined thickness between said first outer surface and said first inner surface;

a second rectangularly shaped metal member having a second outer surface, a second inner surface, a second length, a second height and a second predetermined thickness between said second outer surface and said second inner surface, said second length and said second height of said second metal member being substantially equal to said first length and said first height, respectively;

a pair of first spacer members coupled between said first metal member and said second metal member to form a block with a hollow interior in which said first metal member and said second metal member are arranged substantially parallel to each other and said first spacer members extend between said first and second metal members to form at least one cement cavity;

a rectangularly shaped box extending from said second metal member to form a recess with an open face, said rectangularly shaped box having first and second opposed walls with predetermined lengths and third and fourth opposed walls with predetermined heights that are substantially equal to said second height; and said rectangularly shaped box has a mounting portion with mounting holes formed therein.

2. An embeddable mounting device according to claim 1, further comprising a faceplate coupled to said rectangularly shaped box to cover said open face by fasteners received in said mounting holes.

3. An embeddable mounting device according to claim 2, wherein each of said mounting holes are threaded.

4. An embeddable mounting device according to claim 2, wherein said rectangularly shaped box has a length between said third and fourth opposed walls that is substantially equal to said first length.

5. An embeddable mounting device according to claim 1, wherein said rectangularly shaped box has an electrical outlet box mounted therein.

6. An embeddable mounting device according to claim 1, wherein said rectangularly shaped box has an intermediate wall located between and substantially parallel to said third and fourth opposed walls.

7. An embeddable mounting device according to claim 2, wherein said faceplate has an opening therein.

8. An embeddable mounting device according to claim 2, wherein said faceplate includes a hook.

9. An embeddable mounting device according to claim 2, wherein said faceplate includes at least one recess.

10. An embeddable mounting device according to claim 2, wherein said tubular member has an electrical outlet box mounted therein.

* * * * *